(12) United States Patent
Li et al.

(10) Patent No.: US 10,521,638 B2
(45) Date of Patent: Dec. 31, 2019

(54) FINGERPRINT IDENTIFICATION SYSTEM

(71) Applicant: Shenzhen Goodix Technology Co., Ltd., Shenzhen, Guangdong (CN)

(72) Inventors: Hsmlun Li, Guangdong (CN); MengTa Yang, Guangdong (CN)

(73) Assignee: Shenzhen Goodix Technology Co., Ltd., Shenzhen, Guangdong (CN)

( * ) Notice: Subject to any disclaimer, the term of this patent is extended or adjusted under 35 U.S.C. 154(b) by 16 days.

(21) Appl. No.: 15/820,390

(22) Filed: Nov. 21, 2017

(65) Prior Publication Data

US 2018/0096185 A1    Apr. 5, 2018

Related U.S. Application Data

(63) Continuation of application No. PCT/CN2016/100454, filed on Sep. 27, 2016.

(51) Int. Cl.
| | |
|---|---|
| *G06K 9/00* | (2006.01) |
| *G06F 3/044* | (2006.01) |
| *H02M 1/14* | (2006.01) |
| *H02M 3/07* | (2006.01) |

(52) U.S. Cl.
CPC ........... *G06K 9/0002* (2013.01); *G06F 3/044* (2013.01); *G06K 9/0008* (2013.01); *H02M 1/14* (2013.01); *H02M 3/07* (2013.01)

(58) Field of Classification Search
CPC ............. G06K 9/0002; G06K 9/00006–0012
USPC .................................................. 382/124–127
See application file for complete search history.

(56) References Cited

U.S. PATENT DOCUMENTS

| | | | | |
|---|---|---|---|---|
| 8,164,367 | B1* | 4/2012 | Bal | ...................... H03L 7/16 |
| | | | | 327/157 |
| 2004/0109590 | A1* | 6/2004 | Cannon | ............ G06K 9/00067 |
| | | | | 382/125 |
| 2007/0297655 | A1* | 12/2007 | Monden | ............ G06K 9/00026 |
| | | | | 382/125 |
| 2008/0298646 | A1* | 12/2008 | Wennergren | ....... G06K 9/00087 |
| | | | | 382/124 |
| 2009/0251188 | A1* | 10/2009 | Kim | ...................... H02M 3/073 |
| | | | | 327/291 |
| 2009/0252385 | A1* | 10/2009 | Dean | ..................... G06K 9/0002 |
| | | | | 382/124 |
| 2011/0168782 | A1* | 7/2011 | Bergler | ............... H01L 23/5223 |
| | | | | 235/492 |

(Continued)

FOREIGN PATENT DOCUMENTS

| | | |
|---|---|---|
| CN | 102055467 A | 5/2011 |
| CN | 105046192 A | 11/2015 |

(Continued)

*Primary Examiner* — Santiago Garcia
(74) *Attorney, Agent, or Firm* — Winston Hsu

(57) ABSTRACT

The present invention provides a fingerprint identification system includes a charge pump circuit configured to generate a supply voltage, wherein the charge pump circuit receives a first clock signal; a pixel circuit, forming a touch capacitance, determining whether the pixel circuit is corresponding to a finger valley or a finger ridge according to the touch capacitance, wherein the pixel circuit receives a second clock signal and the supply voltage; and a clock generating circuit, configured to generate the first clock signal and the second clock signal; wherein the first clock signal is related to the second clock signal.

9 Claims, 5 Drawing Sheets

(56) References Cited

U.S. PATENT DOCUMENTS

| | | | |
|---|---|---|---|
| 2011/0216033 A1 | 9/2011 | Mamba | |
| 2012/0306619 A1* | 12/2012 | Longo | G06K 9/0002 340/5.83 |
| 2013/0169582 A1* | 7/2013 | Ryshtun | G06F 3/0416 345/174 |
| 2016/0033988 A1* | 2/2016 | Voorwinden | H02M 3/07 323/300 |
| 2016/0063301 A1* | 3/2016 | Wu | G06K 9/00033 382/124 |
| 2016/0350573 A1* | 12/2016 | Kitchens, II | G06K 9/0002 |
| 2017/0060321 A1* | 3/2017 | Jeong | G06F 3/0416 |
| 2017/0124370 A1* | 5/2017 | He | G06K 9/0012 |
| 2017/0177934 A1* | 6/2017 | Ran | G06K 9/00013 |
| 2017/0323134 A1* | 11/2017 | Yeo | G06K 9/0002 |
| 2018/0089487 A1* | 3/2018 | Kang | G06F 3/0412 |
| 2018/0089489 A1* | 3/2018 | Liang | G06K 9/0002 |

FOREIGN PATENT DOCUMENTS

| | | |
|---|---|---|
| CN | 105138957 A | 12/2015 |
| CN | 105373765 A | 3/2016 |
| JP | 2011-180854 A | 9/2011 |
| KR | 10-2016-0055507 A | 5/2016 |
| WO | 2016/076562 A1 | 5/2016 |

\* cited by examiner

FINGERPRINT IDENTIFICATION SYSTEM

CROSS REFERENCE TO RELATED APPLICATIONS

The present application is a continuation of international application No. PCT/CN2016/100454, filed on Sep. 27, 2016, of which are incorporated herein by reference in its entirety.

FIELD OF THE INVENTION

The present invention relates to a fingerprint identification system, and more particularly, to a fingerprint identification system capable of reducing effect caused by ripple.

BACKGROUND

With the development of technology, mobile phones, digital cameras, tablet PCs, notebook computers and other portable electronic devices become more and more popular. The portable electronic devices are intended for personal use, with certain privacy. The information stored in the portable device such as phonebook, photos, personal information, etc., are privately owned. If the electronic device is lost, these data may be accessed by other people, causing unnecessary loss. Even though there are several ways using password to protect the electronic device from being used by the other people, the password may be easily to be spread or cracked, which lowers the security. Moreover, the user needs to remember the password so as to use electronic devices. If the user forgets the password, troubles would be brought to the user. Hence, personal fingerprint identification is utilized to achieve the purpose of personal identification, for enhancing the data security.

In general, the fingerprint identification system utilizes the pixel circuit to receive a finger touch. The pixel circuit would convert a touch capacitance, formed between the pixel circuit and the finger, as the pixel output signal, and the backend circuit of the pixel circuit may determine whether the pixel circuit is corresponding to a finger ridge or a finger valley, according to the pixel output signal. In addition, the power of the pixel circuit is supplied by a charge pump. The pixel circuit receives a pixel clock signal clk_pxl so as to convert the touch capacitance into the pixel output signal. The charge pump circuit receives a charge pump clock signal clk_cp to output a supply voltage $V_{supply}'$ to the pixel circuit. Unavoidably, the supply voltage generated by the charge pump circuit has a ripple rp', and a waveform of the ripple rp' is related to the charge pump clock signal clk_cp.

Generally, the pixel clock signal clk_pxl and the charge pump clock signal clk_cp do not have direct relationship in between. Under a condition that the pixel clock signal clk_pxl is independent of the charge pump clock signal clk_cp, among every sampling interval of the pixel circuit, the average of the ripple rp' is not the same. In this case, the ripple rp' of the charge pump circuit would bring more noise to the fingerprint identification system and reduce an accuracy of the fingerprint identification, such that an overall performance of fingerprint identification is reduced.

Therefore, how to reduce effect caused by ripple is a significant objective in the field.

SUMMARY

It is therefore a primary objective of the present invention to provide a fingerprint identification system reducing effect caused by ripple, to improve over disadvantages of the prior art.

To solved the problem stated in the above, the present invention/application provides a fingerprint identification system, comprises a charge pump circuit, configured to generate a supply voltage, wherein the charge pump circuit receives a first clock signal; a pixel circuit, forming a touch capacitance, determining whether the pixel circuit is corresponding to a finger valley or a finger ridge according to the touch capacitance, wherein the pixel circuit receives a second clock signal and the supply voltage; and a clock generating circuit, configured to generate the first clock signal and the second clock signal; wherein the first clock signal is related to the second clock signal.

Preferably, the clock generating circuit comprises a clock generating unit configured to generate the first clock signal.

Preferably, the clock generating circuit comprises a frequency divider, coupled to the clock generating unit, configured to generate the second clock signal according to the first clock signal.

Preferably, a second period of the second clock signal is an even multiple of a first period of the first clock signal.

Preferably, the second period is twice of the first period.

Preferably, the first clock signal is synchronized with the second clock signal.

Preferably, the first clock signal and the second clock signal have rising edges at the same time.

Preferably, a duty cycle of the first clock signal and the second clock signal is 50%.

Preferably, the pixel circuit charges the touch capacitance during a sampling interval, and the sampling interval is an integer multiple of a first period of the first clock signal.

The fingerprint identification system provided by the present invention utilizes the first clock signal and the second clock signal, which are synchronized with each other, such that when the pixel circuit performs the sampling operation within the sampling interval, the average of the supply voltage generated by the charge pump circuit are the same. Therefore, noise effect on the fingerprint identification system caused by the ripple is reduced, and performance of the fingerprint identification system is enhanced.

These and other objectives of the present invention will no doubt become obvious to those of ordinary skill in the art after reading the following detailed description of the preferred embodiment that is illustrated in the various figures and drawings.

DETAILED DESCRIPTION

In order to make the objects, technical solutions and advantages of the present invention become more apparent, the following relies on the accompanying drawings and embodiments to describe the present invention in further detail. It should be understood that the specific embodiments described herein are only for explaining the present invention and are not intended to limit the present invention.

Figure 1:
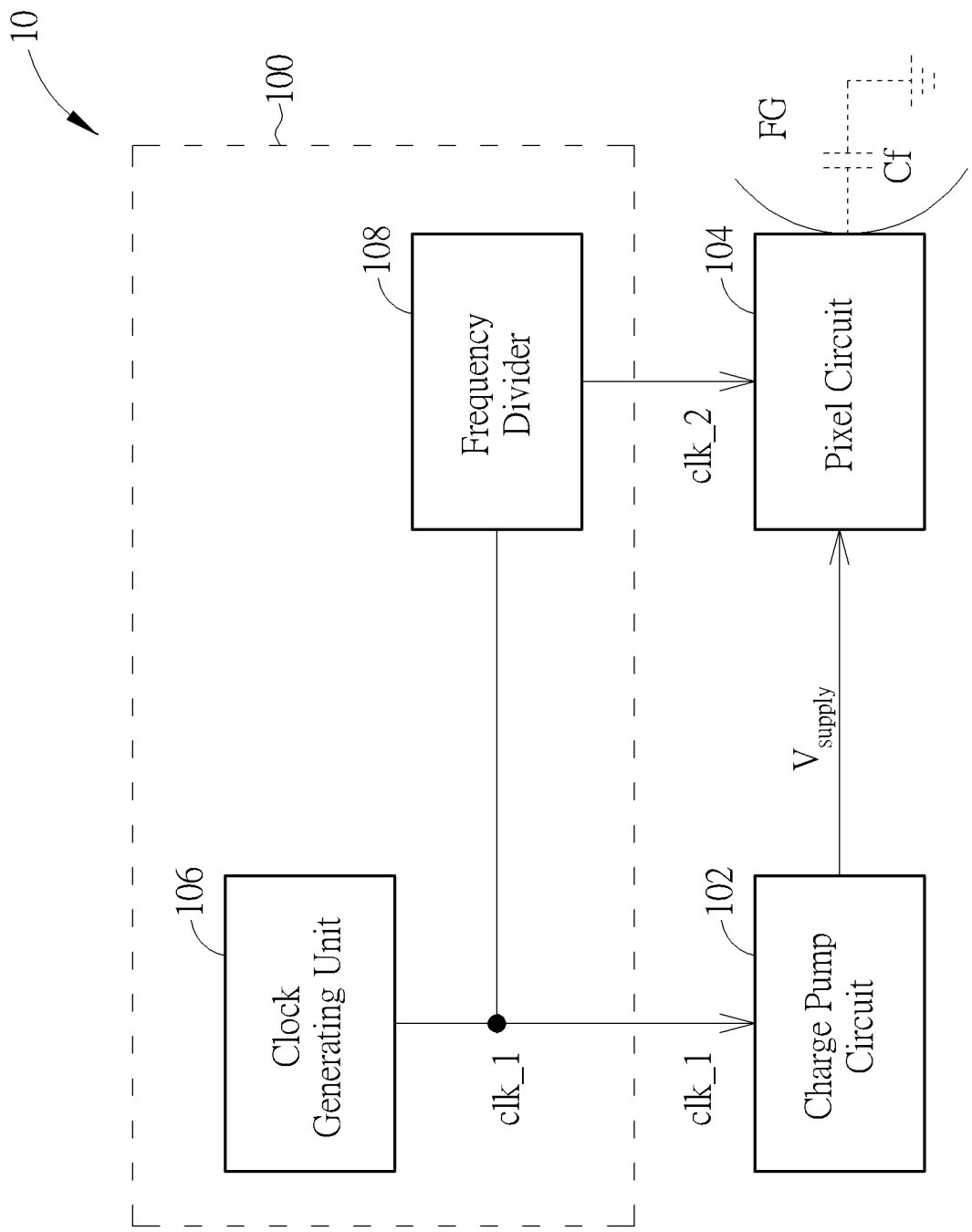
FIG. 1 is a schematic diagram of a fingerprint identification system according to an embodiment of the present invention.
Figure 2:
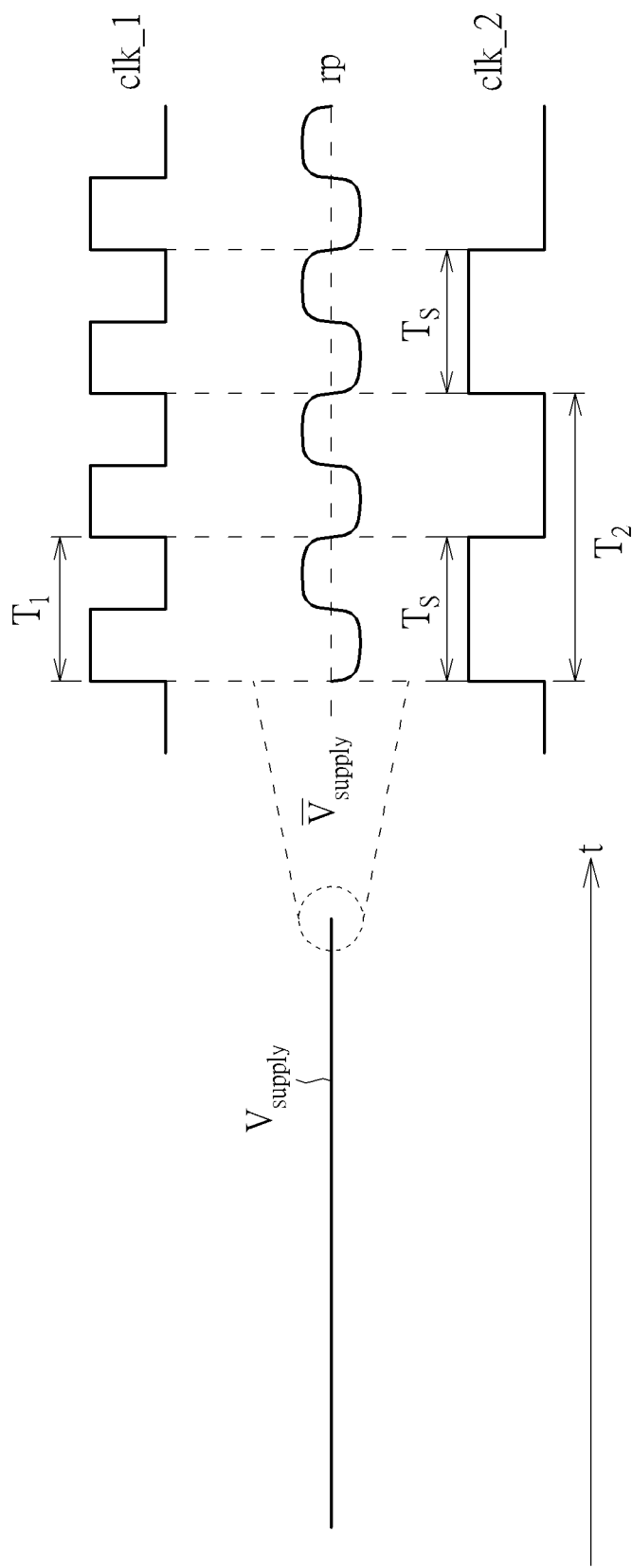
FIG. 2 is a waveform diagram of a plurality of signals according to an embodiment of the present invention/application.

Please refer to FIG. 1 and FIG. 2. FIG. 1 is a schematic diagram of a fingerprint identification system 10 according to an embodiment of the present invention. FIG. 2 is a waveform diagram of a first clock signal clk_1, a supply voltage $V_{supply}$, a ripple rp and a second clock signal clk_2. The fingerprint identification system 10 comprises a clock generating circuit 100, a charge pump circuit 102 and a pixel circuit 104. The pixel circuit 104 forms a touch capacitance Cf with a finger FG. The pixel circuit 104 may convert the touch capacitance Cf into a pixel output signal Vo, and the backend circuit of the pixel circuit 104 (not illustrated in FIG. 1) may determine whether the location at which the pixel circuit 104 locates is corresponding to a finger ridge or a finger valley according to the pixel output signal Vo. The charge pump circuit 102 is configured to provide the supply voltage $V_{supply}$ for the pixel circuit 104. That is, the charge pump circuit 102 generates the supply voltage $V_{supply}$ to the pixel circuit 104, where the supply voltage $V_{supply}$ has a periodical ripple rp. The clock generating circuit 100, coupled to the charge pump circuit 102 and the pixel circuit 104, is configured to generate the first clock signal clk_1 to the charge pump circuit 102 and generate the second clock signal clk_2 to the pixel circuit 104, where the first clock signal clk_1 is related to the second clock signal clk_2. Specifically, as shown in FIG. 2, the first clock signal clk_1 and the second clock signal clk_2 are signals synchronized with each other. To be more precisely, in an embodiment, a rising edge of the second clock signal clk_2 is aligned to/with a rising edge of the first clock signal clk_1. In addition, the first clock signal clk_1 has a first period $T_1$, and the second clock signal clk_2 has a second period $T_2$. The interval when the second clock signal clk_2 is high (voltage) is corresponding to a sampling interval $T_S$, and the sampling interval $T_S$ is an integer multiple of the first period $T_1$, i.e., $T_S = N \cdot T_1$, where N is a positive integer.

In an embodiment, the first clock signal clk_1 and the second clock signal clk_2 are clock signals with 50% duty cycle. The clock generating circuit 100 may comprise a clock generating unit 106 and a frequency divider 108. The clock generating unit 106 is configured to generate the first clock signal clk_1 for the charge pump circuit 102. The frequency divider 108, coupled to the clock generating unit 106, is configured to generate the second clock signal clk_2 for the pixel circuit 104 according to the first clock signal clk_1. The frequency divider 108 may generate the second clock signal clk_2, such that the second period $T_2$ (corresponding to the second clock signal clk_2) is twice of the first period $T_1$ (corresponding to the first clock signal clk_1). That is, the time interval when the second clock signal clk_2 is high voltage is the first period $T_1$ of the first clock signal clk_1 (i.e., $T_S = T_1$, N=1). In this case, among every sampling interval $T_S$ of the pixel circuit 104, the supply voltage $V_{supply}$ would have the same average $\overline{V}_{supply}$. Therefore, noise caused by the ripple rp affecting the fingerprint identification system 10 is reduced, and performance of the fingerprint identification system 10 is enhanced.

Figure 3:
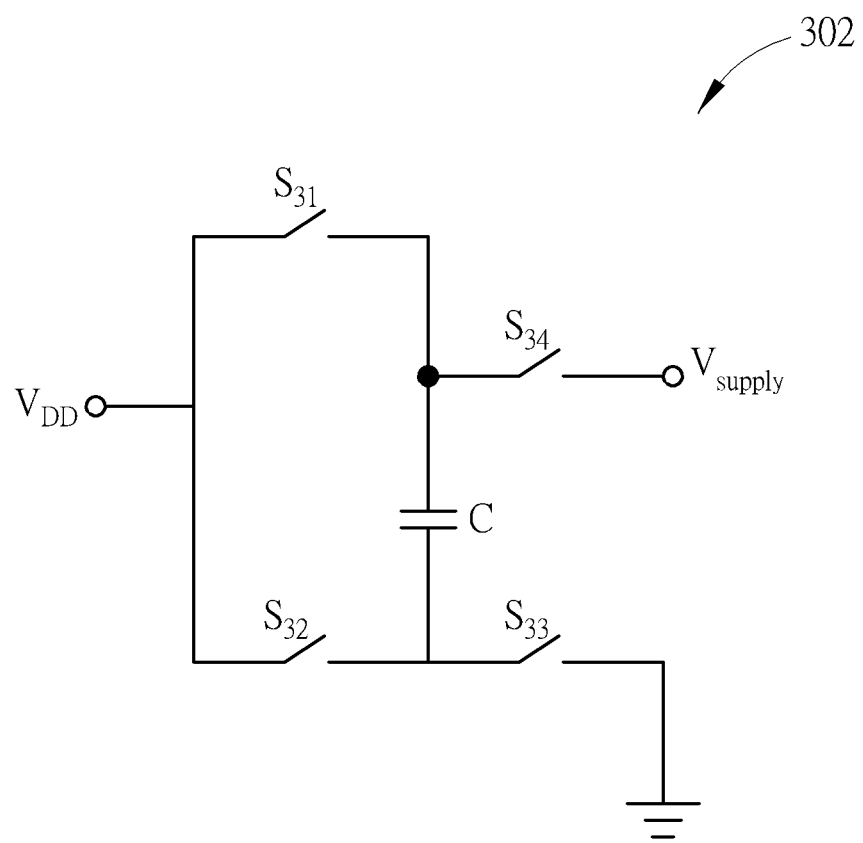
FIG. 3 is a schematic diagram of a charge pump circuit.
Figure 4:
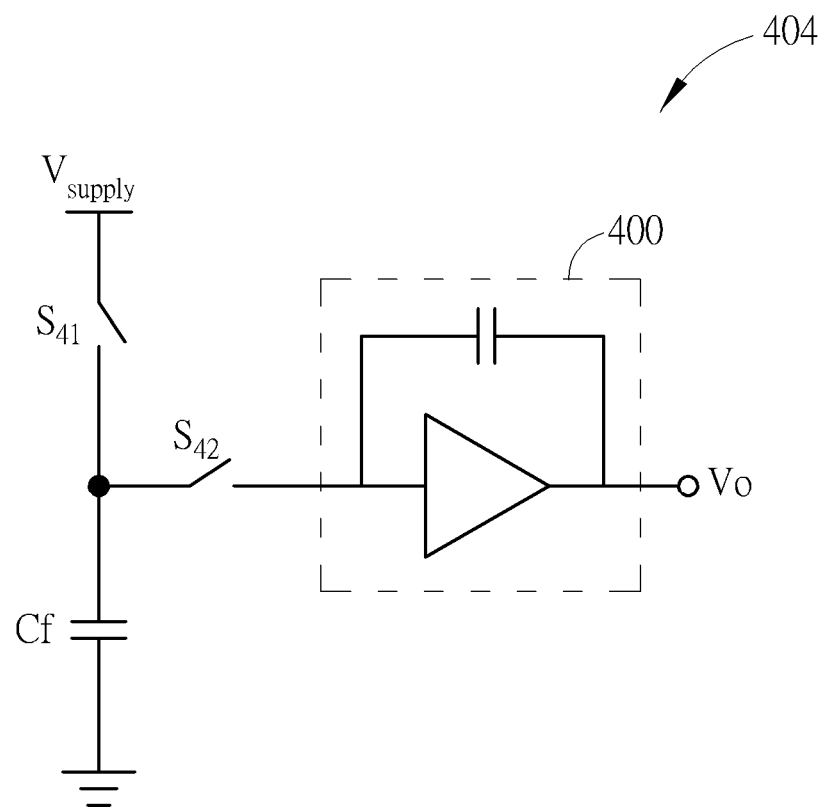
FIG. 4 is a schematic diagram of a pixel circuit.

In addition, implementations of the charge pump circuit 102 and the pixel circuit 104 are not limited to certain circuit structures. For example, please refer to FIG. 3 and FIG. 4. FIG. 3 and FIG. 4 are schematic diagrams of a charge pump circuit 302 and a pixel circuit 404, respectively. The charge pump circuit 302 may be configured to realize the charge pump circuit 102. As shown in FIG. 3, the charge pump circuit 302 comprises switches $S_{31}$-$S_{34}$ and a capacitor C. The switches $S_{31}$ and $S_{34}$ are coupled to a first terminal of the capacitor C. The switches $S_{32}$ and $S_{33}$ are coupled to a second terminal of the capacitor C. The switches $S_{31}$ and $S_{32}$ receives a voltage $V_{DD}$. The switch $S_{33}$ is coupled to a ground terminal. The switch $S_{34}$ is configured to output the supply voltage $V_{supply}$. The switches $S_{31}$-$S_{34}$ are controlled by the first clock signal clk_1. For example, when the first clock signal clk_1 is high, the switches $S_{31}$ and $S_{33}$ are conducted, and the switches $S_{32}$ and $S_{34}$ are cutoff. At this time, the capacitor C is charged by the charge pump circuit 302, which means that the capacitor C is charged up to the voltage $V_{DD}$. On the other hand, when the first clock signal clk_1 is low, the switches $S_{32}$ and $S_{34}$ are conducted, and the switches $S_{31}$ and $S_{33}$ are cutoff. At this time, the supply voltage $V_{supply}$ outputted by the charge pump circuit 302 is $2V_{DD}$.

In addition, the pixel circuit 404 may be configured to realize the pixel circuit 104. As shown in FIG. 4, the pixel circuit 404 comprises switches $S_{41}$, $S_{42}$ and an integrating circuit 400. The switches $S_{41}$ and $S_{42}$ are coupled to the touch capacitance Cf. The switch $S_{41}$ receives the supply voltage $V_{supply}$. The switch $S_{42}$ is coupled to the integrating circuit 400. The switches $S_{41}$ and $S_{42}$ are controlled by the second clock signal clk_2. When the pixel clock signal clk_2 is high (corresponding to the sampling interval $T_S$ in FIG. 2), the pixel circuit 404 performs a sampling operation, which means that the pixel circuit 404 charges the touch capacitance Cf. On the other hand, when the pixel clock signal clk_2 is low, the pixel circuit 404 may exploit charge sharing to convert the charges stored in the touch capacitance into the pixel output signal Vo via the integrating circuit 400. The backend circuit of the pixel circuit 404 may determine whether the location of the pixel circuit 404 is corresponding to a finger ridge or a finger valley according to the pixel output signal Vo.

Figure 5:
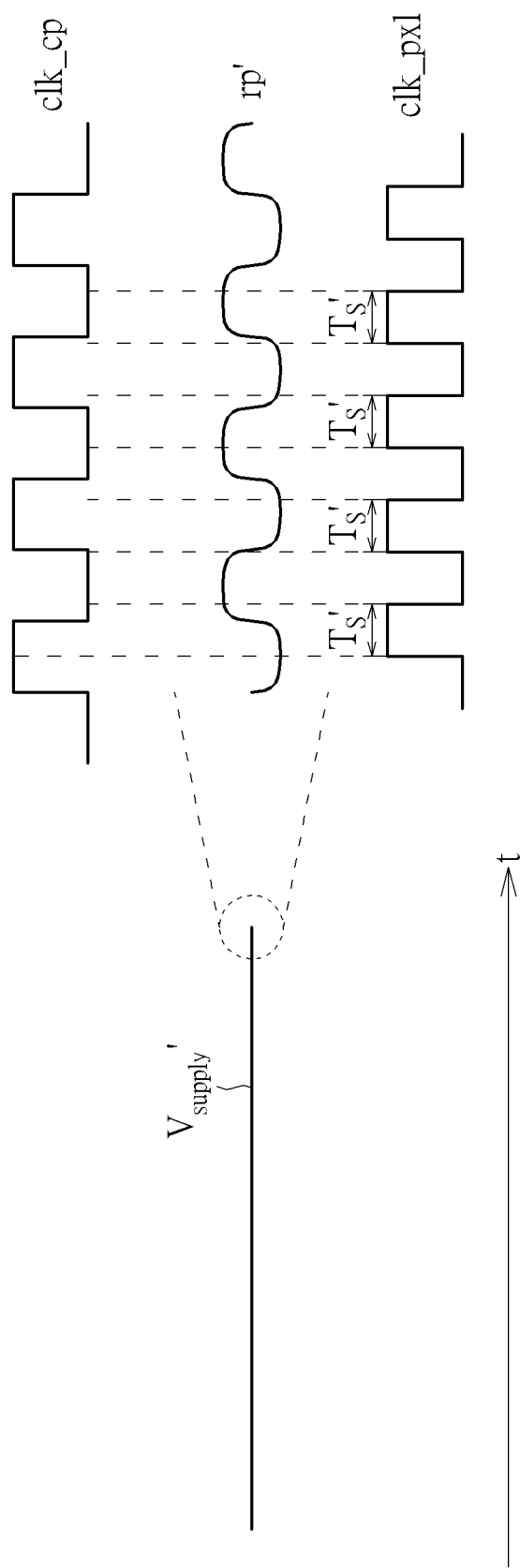
FIG. 5 is a waveform diagram of a plurality of signals.

As can be seen, the clock generating circuit 100 may generate the second clock signal clk_2, such that when the pixel circuit 104/404 performs the sampling operation (i.e., within the sampling interval $T_S$), the average $\overline{V}_{supply}$ of the supply voltage $V_{supply}$ remains the same. In comparison, in the prior art, a pixel clock signal clk_pxl and a charge pump clock signal clk_cp within the pixel circuit do not have direct relationship. Specifically, please refer to FIG. 5, FIG. 5 is a waveform diagram of the charge pump clock signal clk_cp, the pixel clock signal clk_pxl, a supply voltage $V_{supply}'$ and a ripple rp' in the art. In the art, the pixel clock signal clk_pxl and the charge pump clock signal clk_cp are independent clock signals. That is, rising edges of the pixel clock signal clk_pxl and the charge pump clock signal clk_cp do not have certain relationship. In addition, when the pixel clock signal clk_pxl is high (corresponding to the sampling interval $T_S'$), the pixel circuit charges the formed touch capacitance. Under a condition that the pixel clock signal clk_pxl is independent of the charge pump clock signal clk_cp, among every sampling interval $T_S'$ of the pixel circuit, the average of the ripple rp' remains not exactly the same. In this case, the ripple rp' of the charge pump circuit would bring more noise to the fingerprint identification system, and reduce an accuracy of fingerprint identification, such that the overall fingerprint identification performance is reduced. In other words, the fingerprint identification system 10 may reduce noise effect caused by the ripple rp on the fingerprint identification system 10, and enhance the performance of the fingerprint identification system 10.

Notably, the embodiments stated in the above are utilized for illustrating the concept of the present invention. Those skilled in the art may make modifications and alterations accordingly, and not limited herein. For example, when the first clock signal clk_1 and the second clock signal clk_2 are clock signals with 50% duty cycle, the second period $T_2$ are not limited to be twice of the first period $T_1$. The second period $T_2$ may be 4 times, 6 times or 8 times of the first period $T_1$, i.e., the second period $T_2$ may be an even multiple of the first period $T_1$. As long as the sampling interval $T_S$ the pixel circuit 104/404 performing the sampling operation is an integer multiple of the first period $T_1$, the requirements of the present invention are satisfied.

In summary, the present invention provides the first clock signal and the second clock signal, which are synchronized with each other, to the charge pump circuit and the pixel circuit, respectively, such that when the pixel circuit performs the sampling operation within the sampling interval, the average of the supply voltage generated by the charge pump circuit remains the same. Compared to the prior art, the present invention may reduce noise effect of the fingerprint identification system caused by the ripple, and thereby enhance performance of the fingerprint identification system.

The foregoing is only embodiments of the present application, which is not intended to limit the present application. Any modification following the spirit and principle of the present application, equivalent substitutions, improvements should be included within the scope of the present invention.

What is claimed is:

1. A fingerprint identification system, characterized in that, the fingerprint identification system comprises:
    a charge pump circuit, configured to generate a supply voltage, wherein the charge pump circuit receives a first clock signal;
    a pixel circuit, forming a touch capacitance, configured to determine whether the pixel circuit is corresponding to a finger valley or a finger ridge according to the touch capacitance, wherein the pixel circuit receives a second clock signal and the supply voltage; and
    a clock generating circuit, configured to generate the first clock signal to the charge pump circuit and generate the second clock signal to the pixel circuit;
    wherein the first clock signal is related to the second clock signal;
    wherein the pixel circuit charges the touch capacitance during a sampling interval, the sampling interval is an integer multiple of a first period of the first clock signal, the second clock signal for the pixel circuit has a second period, and the second period comprises the sampling interval.

2. The fingerprint identification system as claim 1, characterized in that, the clock generating circuit comprises a clock generating unit configured to generate the first clock signal.

3. The fingerprint identification system as claim 2, characterized in that, the clock generating circuit comprises a frequency divider, coupled to the clock generating unit, configured to generate the second clock signal according to the first clock signal.

4. The fingerprint identification system as claim 1, characterized in that, a second period of the second clock signal is an even multiple of a first period of the first clock signal.

5. The fingerprint identification system as claim 4, characterized in that, the second period is twice of the first period.

6. The fingerprint identification system as claim 1, characterized in that, the first clock signal is synchronized with the second clock signal.

7. The fingerprint identification system as claim 1, characterized in that, the first clock signal and the second clock signal have rising edges at the same time.

8. The fingerprint identification system as claim 1, characterized in that, a duty cycle of the first clock signal and the second clock signal is 50%.

9. The fingerprint identification system as claim 1, characterized in that, the first clock signal has a first period, the second clock signal has a second period, and the second period is larger than the first period.

* * * * *